(12) United States Patent
Iwamoto

(10) Patent No.: US 9,122,108 B2
(45) Date of Patent: Sep. 1, 2015

(54) LIQUID CRYSTAL DISPLAY APPARATUS

(71) Applicant: STANLEY ELECTRIC CO., LTD., Meguro-ku, Tokyo (JP)

(72) Inventor: Yoshihisa Iwamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 16 days.

(21) Appl. No.: 14/030,914

(22) Filed: Sep. 18, 2013

(65) Prior Publication Data

US 2014/0085584 A1   Mar. 27, 2014

(30) Foreign Application Priority Data

Sep. 24, 2012 (JP) ................................ 2012-210220

(51) Int. Cl.
  *G02F 1/1343* (2006.01)
  *G02F 1/1337* (2006.01)
  *G02F 1/139* (2006.01)

(52) U.S. Cl.
  CPC .... *G02F 1/134327* (2013.01); *G02F 1/133707* (2013.01); *G02F 1/1393* (2013.01)

(58) Field of Classification Search
  None
  See application file for complete search history.

(56) References Cited

U.S. PATENT DOCUMENTS

| | | | |
|---|---|---|---|
| 6,816,223 B2 | 11/2004 | Sugiyama et al. | |
| 7,714,968 B2 | 5/2010 | Iwamoto | |
| 2011/0242477 A1* | 10/2011 | Iwamoto | ........................ 349/158 |

FOREIGN PATENT DOCUMENTS

| | | | |
|---|---|---|---|
| JP | 4107978 B2 | 6/2008 | |
| JP | 4846402 B2 | 12/2011 | |
| JP | 4884176 B2 | 2/2012 | |

* cited by examiner

*Primary Examiner* — Richard Kim
(74) *Attorney, Agent, or Firm* — Holtz, Holtz, Goodman & Chick PC

(57) ABSTRACT

The apparatus comprises a first and a second substrate disposed facing each other, a first electrode comprising first openings provided to the first substrate, a second electrode comprising second openings provided to the second substrate, and a liquid crystal layer disposed between the first and the second substrate. A display part is defined in a region where the first and the second electrode overlap, each of the first openings is formed into a rectangular shape in the planar view, each of the second openings is formed into a rectangular shape or cruciform shape in the planar view, the second electrode comprises rectangular regions cyclically disposed inside the display part in the planar view, the four sides that define each of the rectangular regions respectively contact any portion of the second openings, and each of the first openings is disposed overlapping any of the rectangular sections in the planar view.

18 Claims, 9 Drawing Sheets

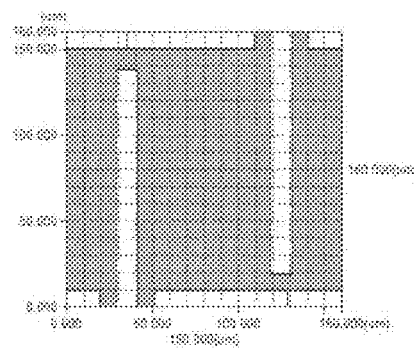 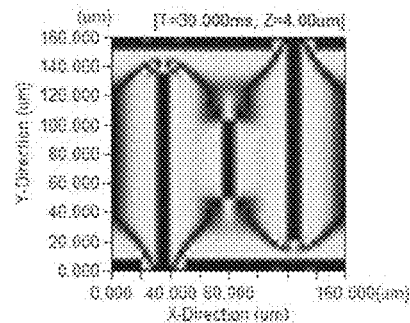
Fig. 11A		Fig. 11B
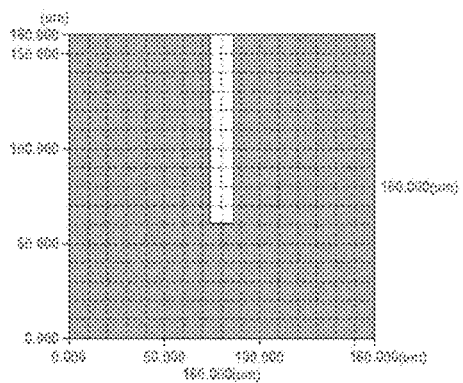 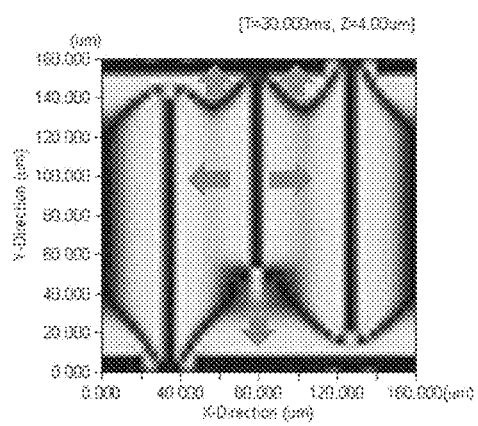
Fig. 12A		Fig. 12B
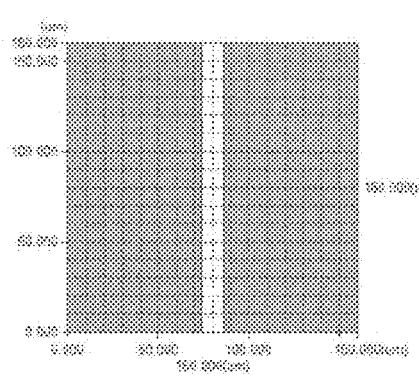 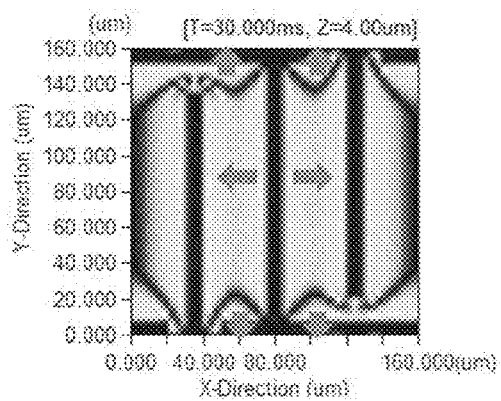
Fig. 13A		Fig. 13B

LIQUID CRYSTAL DISPLAY APPARATUS

BACKGROUND OF THE INVENTION

1. Field of the Invention

The present invention relates to a liquid crystal display apparatus comprising electrodes with openings.

2. Description of the Background Art

As one technique that improves the viewing angle dependency of a liquid crystal display apparatus, there is known a multi-domain orientation technique that provides a plurality of openings (slits) to the respective upper and lower electrodes disposed facing each other and sandwiching a liquid crystal layer therebetween, thereby dividing the orientation domain of the liquid crystal molecules of the liquid crystal layer into a plurality of directions inside a single pixel when voltage is applied to the liquid crystal layer. For example, Japanese Patent No. 4107978 discloses a liquid crystal display apparatus (liquid crystal display device) wherein each opening of an upper electrode and each opening of a lower electrode are alternately disposed in the respective shorter directions in the planar view, thereby obtaining two orientation domains in which the orientation directions of the liquid crystal molecules differ from each other by 180° (degrees) in the liquid crystal layer when voltage is applied. Further, Japanese Patent No. 4846402 discloses a liquid crystal display apparatus (liquid crystal display device) wherein the longer directions of an opening of an upper electrode and an opening of a lower electrode are respectively set and disposed in two different directions, thereby obtaining four orientation domains in which the orientation directions of the liquid crystal molecules differ from each other by 90° (degrees) in the liquid crystal layer when voltage is applied.

Further, Japanese Patent No. 4884176 discloses a liquid crystal display apparatus (liquid crystal display device) wherein, in a case where the longer directions of an opening of an upper electrode and an opening of a lower electrode are respectively set and disposed in two different directions, the opening of the upper electrode and the opening of the lower electrode are alternately disposed shifted one-half pitch from each other in the planar view, thereby obtaining four orientation domains in which the orientation directions of the liquid crystal molecules differ from each other by 90° (degrees) in the liquid crystal layer when voltage is applied. According to such a configuration, compared to the liquid crystal display apparatus of Japanese Patent No. 4846402, the distance between adjacent openings can be further increased, making it possible to significantly reduce the electrical resistance increase of the electrode as well as the likelihood of the occurrence of electrode disconnection.

Hence, consider a case where an orientation control technique such as described above is applied to a segment display-type liquid crystal display apparatus comprising a display part for predetermined characters, designs, and the like. In this case, each electrode is subjected to pattern formation so that a region where the segment electrode of one substrate overlaps the common electrode of another substrate forms a display part for the above described characters and the like. Normally, since a plurality of display parts is required, a plurality of segment electrodes corresponding to each display part is connected to each other by lead wirings, thereby forming a pattern so that the common electrodes overlap each segment electrode.

However, in a liquid crystal display apparatus that realizes multi-domain orientation by an orientation control technique such as described above, for each electrode of the upper and lower substrates, each opening is provided only to a section corresponding to a display part and not to lead wirings or external extraction electrode parts, making it possible to prevent the disconnection of each electrode.

Nevertheless, in a segment display-type liquid crystal display apparatus such as described above, the segment electrode (or common electrode) is made into a shape that is almost an outline of the display part, causing segment electrode disconnection to more readily occur. Further, even if disconnection does not occur, the electrical resistance more readily increases, resulting in the concern that this may cause display unevenness in which the brightness during a bright display differs between each of the plurality of display parts.

It is therefore an object of the specific aspects of the present invention to provide a technique capable of making a liquid crystal display apparatus (in particular, a segment display type) that uses electrodes comprising openings less susceptible to electrode disconnection and electrical resistance increase.

SUMMARY OF THE INVENTION

The liquid crystal display apparatus according to one aspect of the present invention is a liquid crystal display apparatus comprising (a) a first substrate and a second substrate disposed facing each other, (b) a first electrode comprising a plurality of first openings, provided to the first substrate, (c) a second electrode comprising a plurality of second openings, provided to the second substrate, and (d) a liquid crystal layer disposed between the first substrate and the second substrate, wherein: (e) a display part is defined in a region where the first electrode and the second electrode overlap, (f) each of the plurality of first openings is formed into a substantially rectangular shape in the planar view, (g) each of the plurality of second openings is formed into a substantially rectangular shape, T-shape, inverted T-shape, or cruciform shape in the planar view, (h) the second electrode further comprises a plurality of rectangular regions cyclically disposed inside the display part in the planar view, (i) the four sides that define each of the plurality of rectangular regions respectively contact any portion of the plurality of second openings, and (j) each of the plurality of first openings is disposed overlapping any of the plurality of rectangular regions in the planar view.

According to the above described configuration, in a case where the shape and surface area of the upper and lower electrodes need to be made dissimilar, such as in a segment display-type liquid crystal display apparatus, for example, the first electrode provided with the first opening comprising a relatively simple shape can be used as the electrode for which the electrode surface area decreases, and the second electrode provided with the second opening comprising a relatively complex shape can be used as the electrode for which the electrode surface area increases. With this arrangement, it is possible to more readily prevent electrode disconnection and make the apparatus less susceptible to display unevenness caused by increases in electrical resistance.

In the liquid crystal display apparatus described above, the shape of the second opening in the planar view is preferably a combination of a plurality of types, including a substantially rectangular shape, T-shape, inverted T-shape, and substantially cruciform shape.

In the liquid crystal display apparatus described above, each of the plurality of first openings is preferably disposed to one side vertically or horizontally with respect to the center of any of the plurality of rectangular regions in the planar view.

With this arrangement, it is possible to control the surface area in the planar view of the respective orientation domains oriented in a plurality of directions inside each of the rectangular regions by the position of each of the first openings, thereby making it possible to freely control the viewing angle dependency.

In the liquid crystal display apparatus described above, each of the plurality of rectangular regions may be disposed in a checkerboard pattern with respect to the vertical direction and/or horizontal direction in the planar view.

In the liquid crystal display apparatus described above, each of the plurality of first openings and the plurality of second openings is preferably provided only to the display part.

In the liquid crystal display apparatus described above, the display part is preferably configured so as to directly define an outline of predetermined characters or designs.

With this arrangement, it is possible to prevent electrode disconnection and electrical resistance increase in a segment display-type liquid crystal display apparatus.

BRIEF DESCRIPTION OF THE DRAWINGS

FIG. 11A is a figure showing the structure of the second electrode based on simulation analysis. FIG. 11B is a figure showing the calculation result of the orientation texture.

FIG. 12A is a figure showing the structure of the first electrode based on simulation analysis. FIG. 12B is a figure showing the calculation result of the orientation texture.

FIG. 13A is a figure showing the structure of the first electrode based on simulation analysis. FIG. 13B is a figure showing the calculation result of the orientation texture.

DESCRIPTION OF THE PREFERRED EMBODIMENTS

The following describes embodiments of the present invention with reference to drawings.

Embodiment 1

Figure 1:
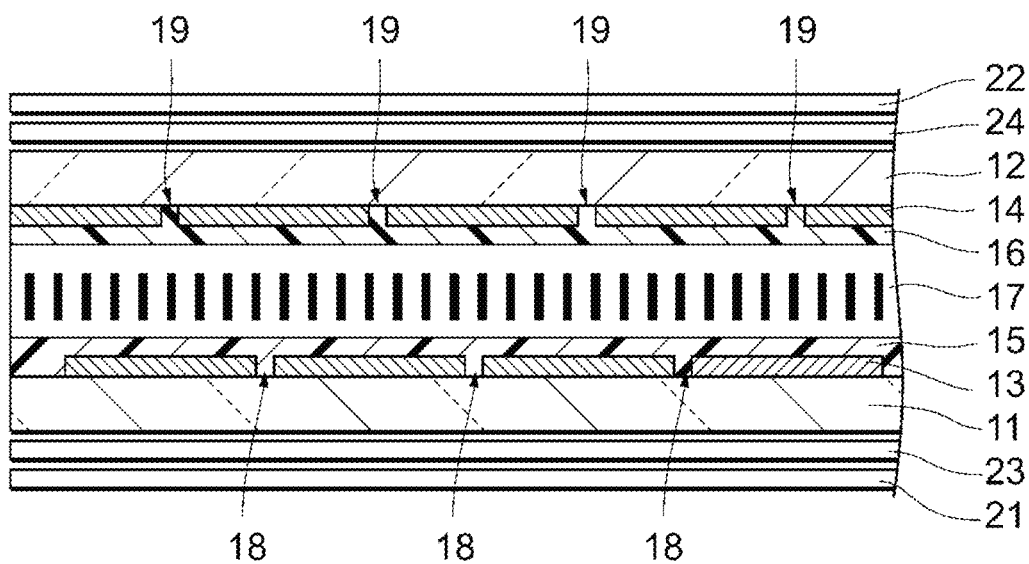
FIG. 1 is a cross-sectional view showing the basic structure of the liquid crystal display apparatus of embodiment 1.

FIG. 1 is a cross-sectional view showing the basic structure of the liquid crystal display apparatus of embodiment 1. This liquid crystal display apparatus comprises a first substrate 11 and a second substrate 12 disposed facing each other, a first electrode 13 provided to the first substrate 11, a second electrode 14 provided to the second substrate 12, and a liquid crystal layer 17 disposed between the first substrate 11 and the second substrate 12, as a basic configuration. For example, the liquid crystal display apparatus of this embodiment is configured so that the region where the electrodes overlap each other forms the characters and designs that the user wants to display. The apparatus is basically capable of displaying only predetermined characters and the like, and is a segment display-type liquid crystal display apparatus wherein generally a region of about 50% or less in terms of the area ratio inside the effective display region contributes to the display of characters and the like. Note that the liquid crystal display apparatus may be a dot matrix display type wherein a plurality of pixels is arranged in a matrix pattern, or may include both a segment display type and a dot matrix display type.

The first substrate 11 and the second substrate 12 are each a transparent substrate, such as a glass substrate, plastic substrate, or the like, for example. As shown, the first substrate 11 and the second substrate 12 are bonded together with a predetermined gap (approximately 4 μm (micro-meters), for example) therebetween.

The first electrode 13 is provided to one surface side of the first substrate 11. Similarly, the second electrode 14 is provided to one surface side of the second substrate 12. The first electrode 13 and the second electrode 14 are each configured by suitably patterning a transparent conductive film, such as indium-tin oxide (ITO), for example. A plurality of first openings (first slits) 18 is provided to the first electrode 13, and a plurality of second openings (second slits) 19 is provided to the second electrode 14. The planar-view shapes of each of the first openings 18 and each of the second openings 19 will be described later.

A first alignment film 15 is provided to one surface side of the first substrate 11 so as to cover the first electrode 13. A second alignment film 16 is provided to one surface side of the second substrate 12 so as to cover the second electrode 14. A vertical alignment film that restricts the orientation of the liquid crystal layer 17 to a vertical orientation is used as the first alignment film 15 and the second alignment film 16. A uniaxial orientation process such as a rubbing process is not performed on either of the alignment films.

The liquid crystal layer 17 is provided between the first substrate 11 and the second substrate 12. In this embodiment, the liquid crystal layer 17 is configured using a liquid crystal material with a negative dielectric constant anisotropy $\Delta\epsilon$ (delta epsilon). A refractive index anisotropy $\Delta n$ (delta n) of the liquid crystal material is about 0.09, for example. The bold lines shown in the liquid crystal layer 17 schematically indicate the direction of orientation of the liquid crystal molecules in the liquid crystal layer 17. The liquid crystal layer 17 of this embodiment is set in a vertical orientation in which the direction of orientation of the liquid crystal molecules when a voltage is not applied is vertical with respect to each substrate surface of the first substrate 11 and the second substrate 12.

A first polarizing plate 21 is disposed on the outside of the first substrate 11. Similarly, a second polarizing plate 22 is disposed on the outside of the second substrate 12. The first polarizing plate 21 and the second polarizing plate 22 are disposed so that the respective absorption axes are substantially orthogonal to each other. Further, an optical compensating plate, such as a C plate, may be suitably disposed between each polarizing plate and each substrate. For example, according to this embodiment, optical compensating plates 23 and 24 are disposed between the first substrate 11 and the first polarizing plate 21, and between the second substrate 12 and the second polarizing plate 22, respectively.

Figure 2A:
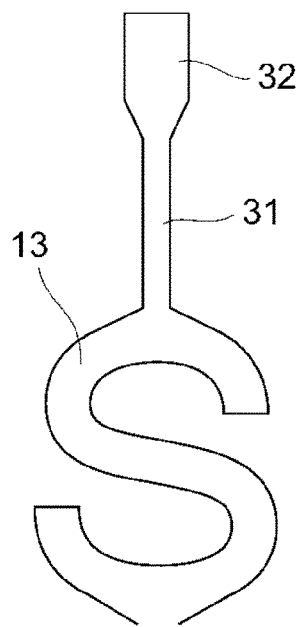
FIG. 2A is a plan view showing an example of the first electrode (segment electrode)
Figure 2B:
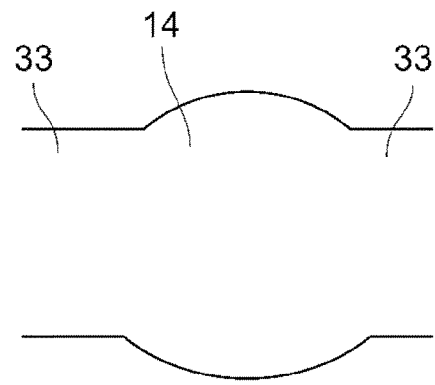
FIG. 2B is a plan view showing an example of the second electrode (common electrode)
Figure 2C:
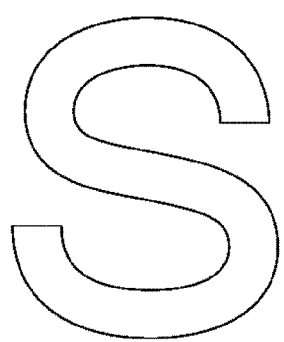
FIG. 2C is a plan view showing an example of the outline shape of the display part.
Figure 2D:
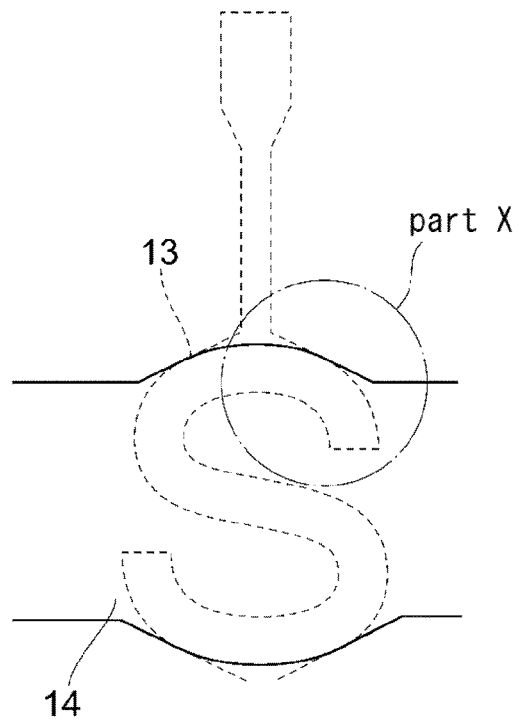
FIG. 2D is a plan view showing the first electrode and second electrode superimposed.

Next, the electrode pattern that constitutes the display part for displaying the letter "S" will be described as an example. FIG. 2A is a plan view showing an example of the first electrode (segment electrode), FIG. 2B is a plan view showing an example of the second electrode (common electrode), FIG. 2C is a plan view showing an example of the outline shape of the display part, and FIG. 2D is a plan view showing the first electrode and second electrode superimposed. As shown in FIG. 2A, the first electrode 13 comprises a planar-view shape close to the letter "S". Then, a lead wiring 31 and an external extraction electrode 32 are provided to the upper part of this first electrode 13. The external extraction electrode 32 is provided for connection to an external circuit (not shown). Further, the lead wiring 31 is for connecting the external extraction electrode 32 and the first electrode 13. Note that, although not shown, a lead wiring for connecting the first electrode of another display part is also provided to the lower part of the first electrode 13. As shown in FIG. 2A, a major portion of the first electrode 13 is understood to correspond to an external edge section of the display part (refer to FIG. 2C). On the other hand, as shown in FIG. 2B, the second electrode 14 is provided to a wide area that covers substantially the entire display part, and a lead wiring 33 for connecting this second electrode 14 to the second electrode 14 of another display part is respectively provided to the left and right. As shown in FIG. 2D, the second electrode 14 overlaps the entire first electrode 13 and comprises a structure that juts out further to the outside than the entire display part, yet partially forms a portion of the external edge of the display part.

Figure 3A:
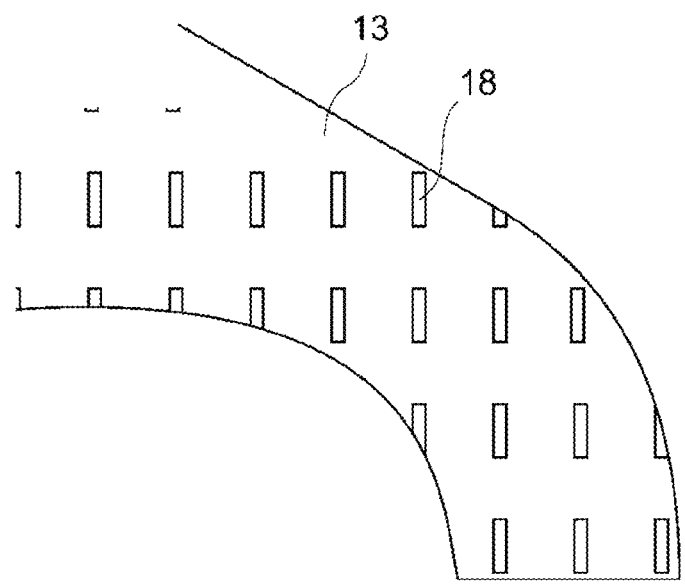
FIG. 3A is a plan view showing an example of each opening of the first electrode of part X (refer to FIG. 2D) of the illustrated display part.
Figure 3B:
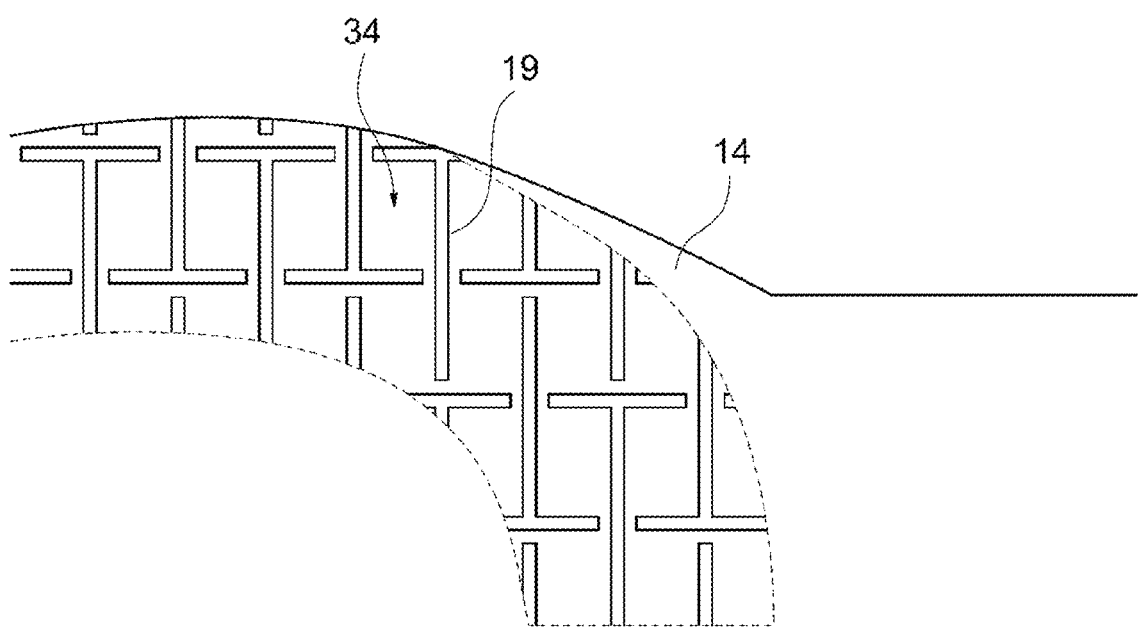
FIG. 3B is a plan view showing an example of each opening of the second electrode of part X (refer to FIG. 2D) of the illustrated display part.

FIG. 3A is a plan view showing an example of each opening of the first electrode of part X (refer to FIG. 2D) of the illustrated display part, and FIG. 3B is a plan view showing an example of each opening of the second electrode of part X (refer to FIG. 2D) of the illustrated display part. As shown in FIG. 3B, each of the second openings 19 is configured by connecting an area that extends in the vertical direction and an area that extends in the horizontal direction in the figure, and comprises an external edge with a T-shape or an external edge with an inverted T-shape in which the T is upside-down. Then, these second openings 19 are provided only to an area (shown by the dashed line) corresponding to the display part of the second electrode 14. Specifically, the arrangement of each of the second openings 19 includes a column wherein the T-shaped second openings 19 are cyclically disposed in the vertical direction, and a column wherein the inverted T-shaped second openings 19 are cyclically disposed in the vertical direction, and these are alternately disposed in the horizontal direction. Further, each of the second openings 19 is cyclically disposed shifted substantially one-half pitch in the vertical direction and horizontal direction, respectively. With this arrangement, a rectangular region 34 surrounded by the one of the T-shaped second openings 19 and the inverted T-shaped second opening 19 adjacent thereto is cyclically arranged in each of the vertical and horizontal directions in the second electrode 14.

On the other hand, as shown in FIG. 3A, each of the first openings 18 comprises an external edge substantially rectangular in shape that extends in the vertical direction in the figure, provided only inside the region corresponding to the display part in the first electrode 13, and cyclically disposed side by side in the vertical direction and in the horizontal direction. Each of the first openings 18 is disposed so that the longer direction thereof is substantially parallel to the longer direction of the each of the vertical extending areas (vertical bars) of the T-shape or the inverted T-shape of each of the second openings 19.

Figure 4:
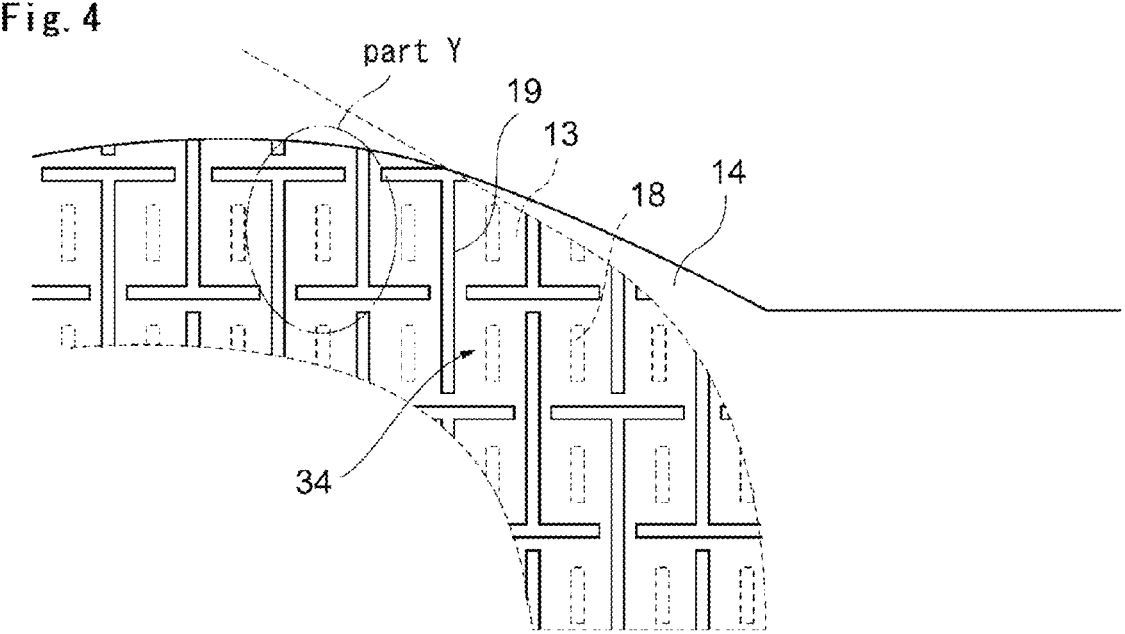
FIG. 4 is a plan view showing the first electrode illustrated in FIG. 3A and the second electrode illustrated in FIG. 3B superimposed.

FIG. 4 is a plan view showing the first electrode illustrated in FIG. 3A and the second electrode illustrated in FIG. 3B superimposed. As shown, each of the first openings 18 is disposed so as to be respectively positioned near the center of each of the rectangular regions 34 of the second electrode 14 in the planar view. Each of the first openings 18 and each of the second openings 19 are both disposed only in regions corresponding to the display part, that is, only in regions where the first electrode 13 and the second electrode 14 overlap, and are not disposed on lead wirings, etc. As described above, since the first electrode 13 comprises a shape that substantially corresponds to the external edge of the display part, the surface area of the region corresponding to the display part is small compared to that of the second electrode 14, resulting in susceptibility to disconnection and a increase in electrical resistance due to the provision of the openings. However, according to this embodiment, each of the first openings 18 of the first electrode 13 comprises a simpler shape compared to each of the second openings 19 of the second electrode 14, the opening surface area of each of the first openings 18 is small, and the interval between the adjacent first openings 18 is widely formed, making it possible to significantly suppress the occurrence of disconnection as well as a increase in electrical resistance.

Figure 5:
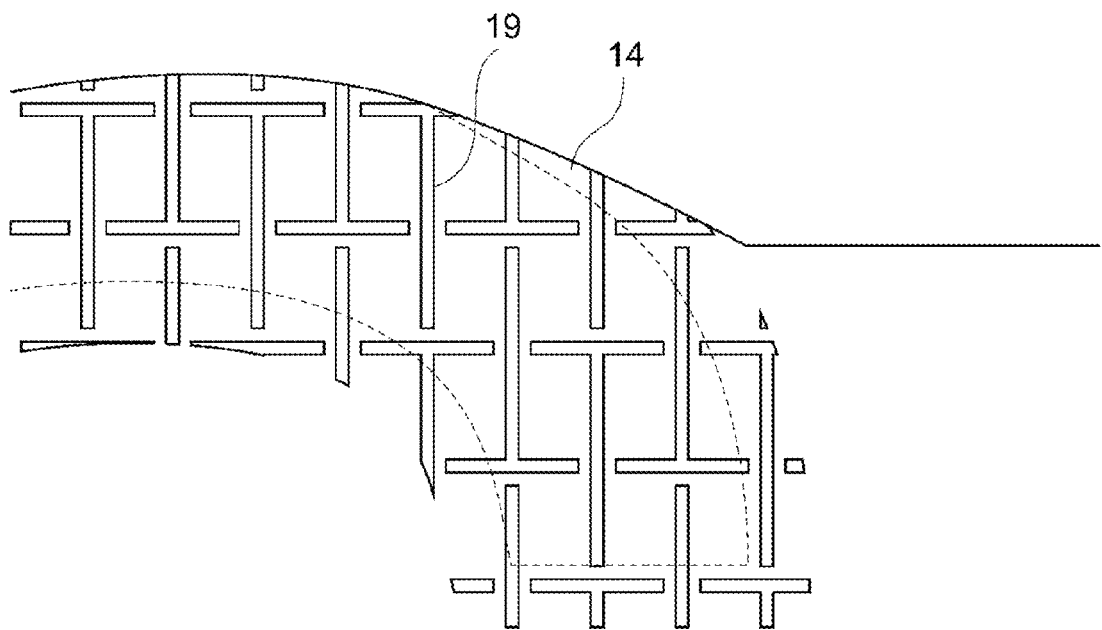
FIG. 5 is a plan view showing another example of each of the openings in the second electrode of part X (refer to FIG. 2D) of the illustrated display part.

FIG. 5 is a plan view showing another example of each of the openings in the second electrode of part X (refer to FIG. 2D) of the illustrated display part. As shown in FIG. 5, a portion of each of the second openings 19 may be disposed to stick out further toward the outside than the external edge (shown by the dashed line) of the display part, within a certain degree of distance. However, since the first electrode 13 juts out further outside the external edge of the display part than the second electrode 14 near the upper and lower sides of the second electrode 14, the second opening 19 is disposed inside the outline of the display part in the region corresponding thereto.

The following describes the results of simulation analysis of the orientation texture of the region (one rectangular region and the peripheral region thereof) equivalent to part Y shown in FIG. 4. This analysis was conducted using the liquid crystal display 3D analysis simulator LCD MASTER 3-D (Version 7) manufactured by SHINTECH, Inc. The conditions of the simulation analysis were as follows (hereinafter the same). The calculation region was set to 160×160 μm (micro-meters), the number of in-plane segments was set to a 50×50 mesh, and the cell thickness was set to 4 μm (micro-meters), establishing the number of segments in the thickness direction as 30. The structure of the first electrode (segment electrode) and the second electrode (common electrode) of the 160×160 calculation region was defined as a cyclical structure in both vertical and horizontal directions. The liquid crystal layer was established with a completely vertical orientation of a 90° (degrees) pretilt angle when voltage is not applied, and the assumed liquid crystal material was a liquid crystal material with a refractive index anisotropy $\Delta n$ (delta n) of substantially 0.09 and a negative dielectric constant anisotropy $\Delta \in$ (delta epsilon). The electrode of the face-side substrate and the electrode of the back-side substrate were established as the second electrode and the first electrode, respectively, potentials of 4 V (volts) and 0 V (volt) were respectively applied to the second electrode and the first electrode, and an orientation texture image was calculated after the orientation of the liquid crystal layer reached a steady state. The face-side polarizing plate and the back-side polarizing plate were disposed in a cross-Nicol arrangement at 45° (degrees) clockwise and 45° (degrees) counterclockwise, respectively, with respect to the horizontal direction of the electrode.

Figure 6A:
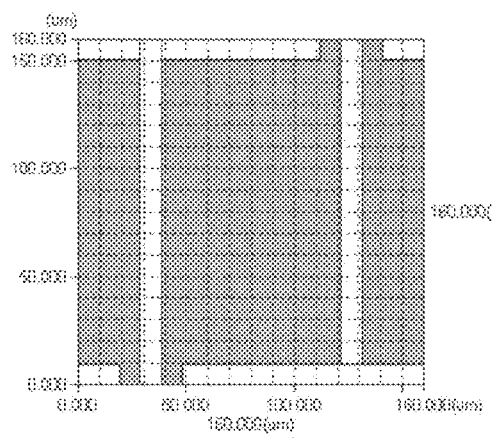
FIG. 6A is a figure showing the structure of the second electrode based on simulation analysis.
Figure 6B:
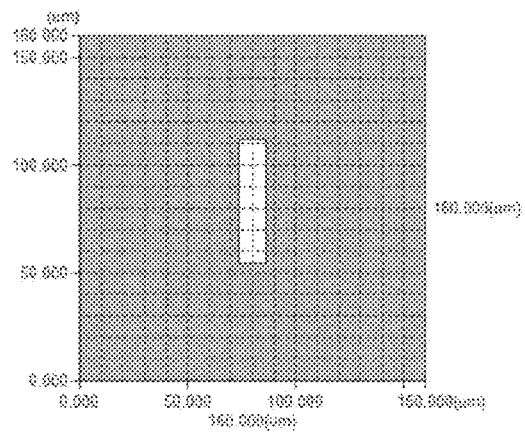
FIG. 6B is a figure showing the structure of the first electrode based on simulation analysis.

FIG. 6A is a figure showing the structure of the second electrode based on simulation analysis. Each of the T-shaped and inverted T-shaped second openings is disposed in the same manner as in the Y part described above. The slit width of each of the second openings was set to substantially 10 μm (micro-meters), the length of each T-shaped and inverted T-shaped horizontal bar section was set to substantially 150 μm (micro-meters), the length of each vertical bar section was set to substantially 160 μm (micro-meters), the disposed interval between adjacent openings was set to substantially 30 μm (micro-meters), and the distance between the edge of each horizontal bar section and edge of the adjacent vertical bar section was set to substantially 10 μm (micro-meters). With this arrangement, the rectangular region surrounded by each of the second openings forms a surface area of substantially 90×150 μm (micro-meters). FIG. 6B is a figure showing the structure of the first electrode based on simulation analysis. The first opening comprises a length in the longer direction of substantially 60 μm (micro-meters) and a length (slit width) in the shorter direction of substantially 10 μm (micro-meters), and is disposed inside the first electrode so as to be positioned in the substantial center of the rectangular region of the second electrode in the planar view. The distance between each horizontal long-side edge of this first opening and the edge of each of the second openings of the second electrode is set to substantially 35 μm (micro-meters) in the planar view, and the distance between each vertical short-side edge and the edge of each second opening is set to substantially 40 μm (micro-meters) in the planar view.

Figure 6C:
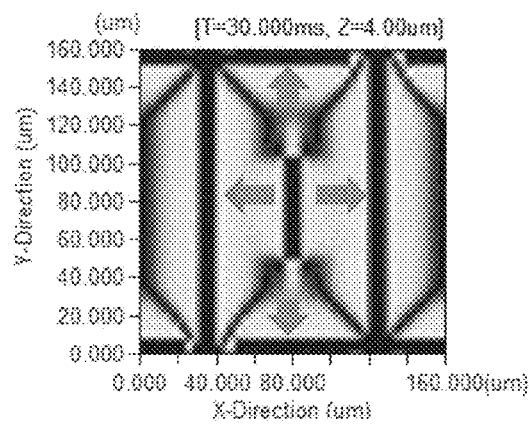
FIG. 6C is a figure showing the calculation result of the orientation texture.

FIG. 6C is a figure showing the calculation result of the orientation texture. A multi-domain orientation wherein dark regions are formed between the short-side edges of the first opening positioned in the substantial center of the rectangular region and the opening edges disposed on the four corners themselves or the periphery of the four corners of the rectangular region is obtained. In the bright regions of the rectangular region, the liquid crystal molecules are mainly oriented in the directions of the arrows shown in the figure. That is, each of the orientation regions is respectively oriented in one of four directions, and the dark regions therebetween are considered to be boundary regions that are oriented while continually rotating between the orientation directions within the adjacent main orientation regions.

Embodiment 2

As a structure that achieves the same advantages as those of the above described embodiment 1, each of the second openings can be simply made into an inverted T-shape.

Figure 7:
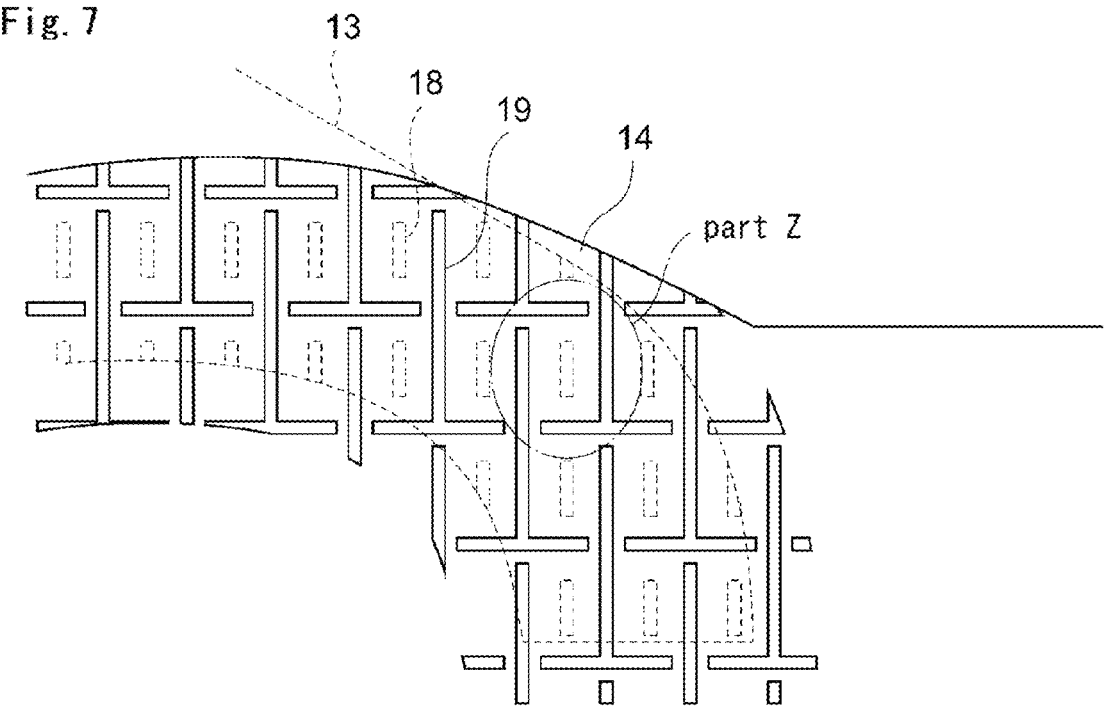
FIG. 7 is a plan view showing the first electrode and the second electrode of the embodiment 2 superimposed.
Figure 8:
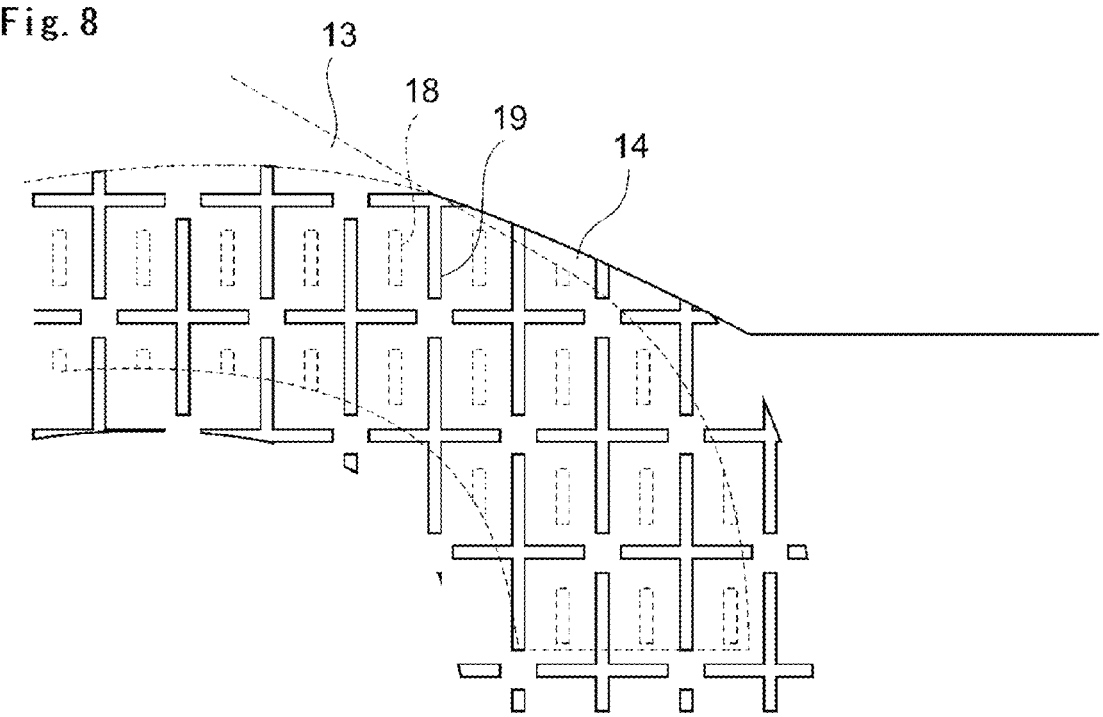
FIG. 8 is a plan view showing another example of the first electrode and the second electrode of the embodiment 2 superimposed.
Figure 9:
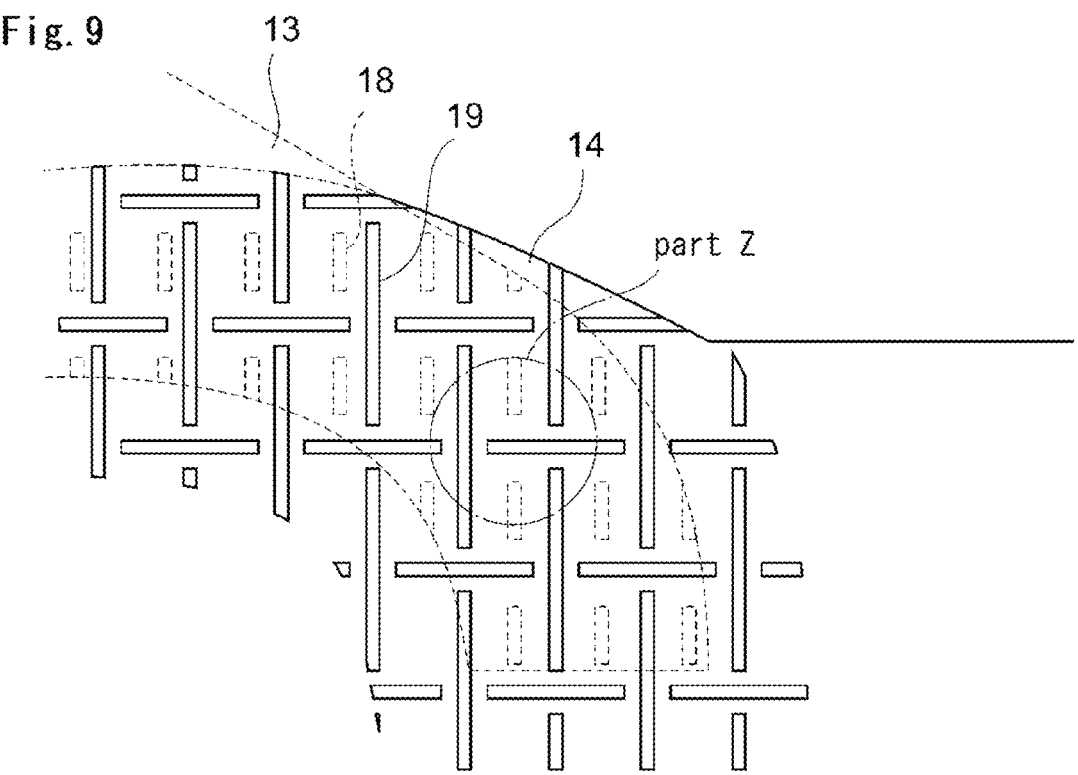
FIG. 9 is a plan view showing another example of the first electrode and the second electrode of the embodiment 2 superimposed.
Figure 10:
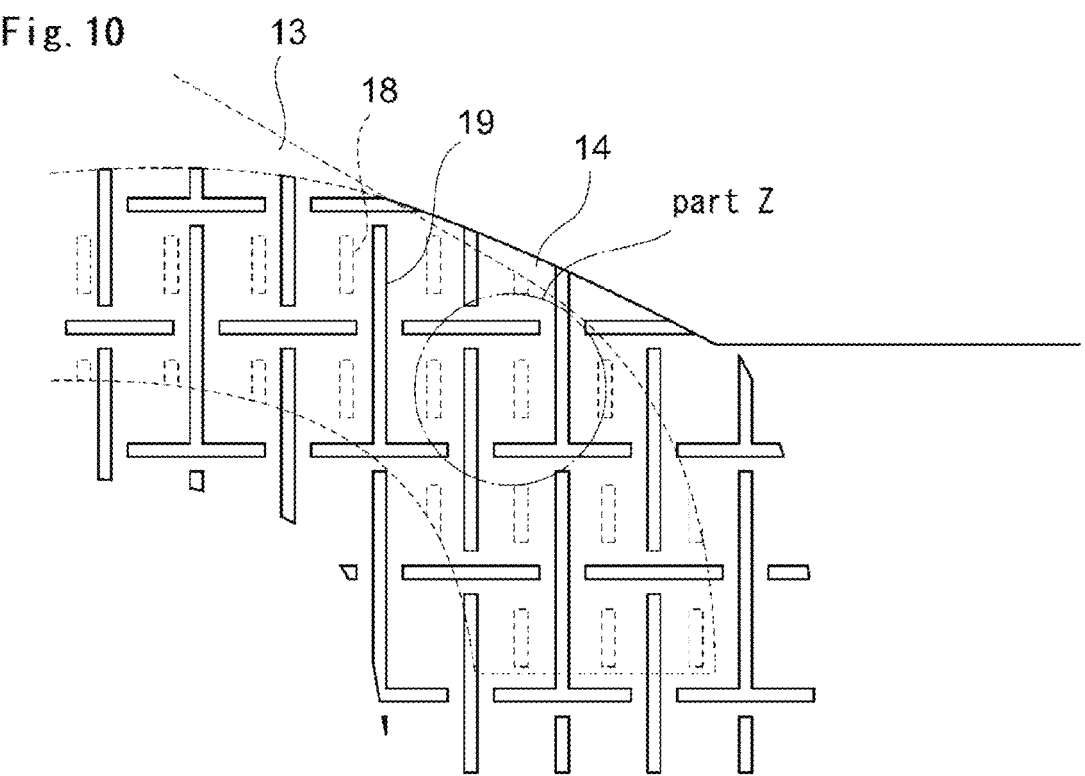
FIG. 10 is a plan view showing another example of the first electrode and the second electrode of the embodiment 2 superimposed.

FIG. 7 is a plan view showing the first electrode and the second electrode of the embodiment 2 superimposed. Note that the overall configuration of the liquid crystal display apparatus is the same as that of embodiment 1 and explanations thereof will be omitted (the same holds true for the embodiments hereafter). As illustrated in FIG. 7, all of the second openings 19 of the second electrode 14 are inverted T-shaped openings and respectively cyclically disposed in the vertical direction and the horizontal direction. At this time, while each of the second openings 19 in adjacent columns comprises an inverted T-shape and is cyclically disposed in the vertical direction, the positions of the center of gravity thereof are shifted substantially one-half pitch per column. On the other hand, the structures of the first electrode 13 and each of the first openings 18 provided thereto are the same as those of the embodiment 1. Note that, as another example, the shape of each of the second openings 19 of the second electrode 14 may be cruciform, as shown in FIG. 8. Each of the second openings 19 illustrated in FIG. 8 is cyclically disposed in the vertical direction and horizontal direction, respectively, and the positions of the center of gravity thereof are shifted substantially one-half pitch per column. The structures of the first electrode 13 and each of the first openings 18 provided thereto are the same as those of the embodiment 1. Further, as another example, each of the second openings 19 of the second electrode 14 may be formed with the substantially rectangular openings that extend in the vertical direction and the horizontal direction regularly disposed at a predetermined distance without crossing each other or connecting to each other, as shown in FIG. 9. For each of the second openings 19 illustrated in FIG. 9, the centers of gravity of the substantially rectangular openings that extend in the vertical direction and the horizontal direction shift in the horizontal direction and the vertical direction each substantial one-half pitch per column and per row, respectively. The structures of the first electrode 13 and each of the first openings 18 provided thereto are the same as those of the embodiment 1. Further, as shown in FIG. 10, the second openings 19 can also be achieved by a combination of substantially rectangular openings that extend in the vertical direction and the horizontal direction, and inverted T-shape openings. Furthermore, the types of openings of the shapes shown in FIG. 4 and FIGS. 7-9 may be combined in plurality.

The following describes the results of simulation analysis of the orientation texture of the region (one rectangular region and the peripheral region thereof) equivalent to part Z shown in FIG. 9. The conditions of the simulation analysis are generally the same as those of embodiment 1. FIG. 11A is a figure showing the structure of the second electrode based on simulation analysis. The rectangular openings that extend in the vertical direction and the horizontal direction are disposed in a checkerboard pattern shifted substantially one-half pitch per column and per row, in the same manner as the above described part Z. The slit width of each of the second openings was set to substantially 10 μm (micro-meters), the length in the longer direction of the rectangular opening that extends in the vertical direction was set to substantially 140 μm (micro-meters), the distance between the nearby edges of the rectangular openings that extend in the vertical direction adjacent to the horizontal direction was set to 80 μm (micro-meters), the length in the longer direction of the rectangular opening that extends in the horizontal direction was set to substantially 110 μm (micro-meters), the distance between the nearby edges of rectangular openings that extend in the horizontal direction adjacent to the vertical direction was set to substantially 140 μm (micro-meters), and the distance between adjacent edges of rectangular openings that extend in the vertical direction and rectangular openings that extend in the horizontal direction was set to substantially 10 μm (micro-meters). With this arrangement, the rectangular region surrounded by each of the second openings forms a surface area of substantially 90×150 μm (micro-meters). Note that the structure of the first electrode based on simulation analysis is the same as that of FIG. 6B described above. FIG. 11B is a figure showing the calculation result of the orientation texture. From the figure it is understood that dark regions that connect the short-side edges of the first opening positioned in the substantial center of the rectangular region and the short-side edges of the openings disposed near the four corners of the rectangular region are formed. In this orientation texture as well, the directions of orientation in the areas between the main orientation regions that are adjacent to the four main orientation regions, which are bright regions oriented in each of the vertical and horizontal directions, are thought to rotate and form the dark regions.

Embodiment 3

While the embodiment 1 and the embodiment 2 described above indicate cases where four main orientation regions exist and the surface areas of the main orientation regions of each of the vertical and horizontal directions are substantially equal, it is also possible to control viewing angle dependency by narrowing and widening specific main orientation directions.

FIG. 12A is a figure showing the structure of the first electrode based on simulation analysis. Note that the structures of the second electrode and second opening are the same as those shown in FIG. 11A described above. The first opening of the first electrode shown here comprises a structure wherein the long side extends up to the upper side edge of the rectangular region configured by the second openings of the second electrode in relation to the upward direction. Note that the conditions of simulation analysis are the same as those described above. FIG. 12B is a figure showing the calculation result of the orientation texture. From the figure it is understood that dark regions that connect the short-side edges of the first opening positioned in the substantial center of the rectangular region and the short-side edges of the openings disposed near the four corners of the rectangular region are formed. In this orientation texture as well, the directions of orientation in the areas between the main orientation regions that are adjacent to the four main orientation regions, which are bright regions oriented in each of the vertical and horizontal directions, are thought to rotate and form the dark regions. While the main orientation regions comprising orientation directions in each of the leftward, rightward, and downward directions clearly exist, it is understood that the region showing an upward orientation direction is divided into two, significantly decreasing the surface area. Since dark regions are observed at the boundary regions of each of the main orientation regions, a favorable orientation texture is considered to be obtained, and external observation assessment results of favorable visibility in mainly three directions are achieved.

Note that, as shown in FIG. 13A, the first opening of the first electrode extends further upward, making it also possible to configure a structure that substantially divides the rectangular region configured by the second openings of the second electrode into two. FIG. 13B is a figure showing the calculation result of the orientation texture. While the main orientation regions comprising orientation directions in vertical and horizontal directions clearly exist, it is understood that the regions showing upward and downward orientations are each divided into two, significantly decreasing the surface area. Since dark regions are observed at the boundary regions of each of the main orientation regions, a favorable oriented structure is considered to be obtained, and external observation assessment results of favorable visibility in mainly two directions are achieved.

Note that while the first opening of the first electrode is disposed in the substantial center of the rectangular region in each of the simulation analyses described above, the first opening of the first electrode may be disposed shifted from the substantial center in the horizontal direction of the rectangular region. With this arrangement, it is possible to achieve the advantage of making the surface area of the main orientation regions in the horizontal direction asymmetrical, thereby making the viewing angle dependency in the horizontal direction asymmetrical.

Embodiment 4

While the shape of the first opening of the first electrode was substantially rectangular in the embodiment 3 described above, the area ratio of the main orientation regions can be adjusted using other shapes as well.

Figure 14A:
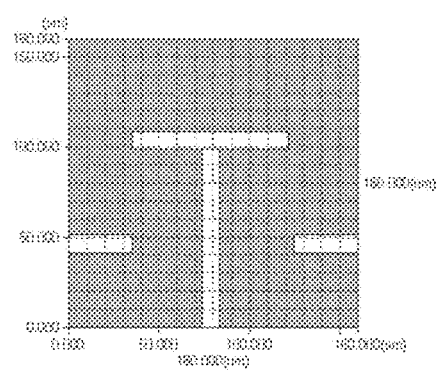
FIG. 14A is a figure showing the structure of the first electrode based on simulation analysis.
Figure 14B:
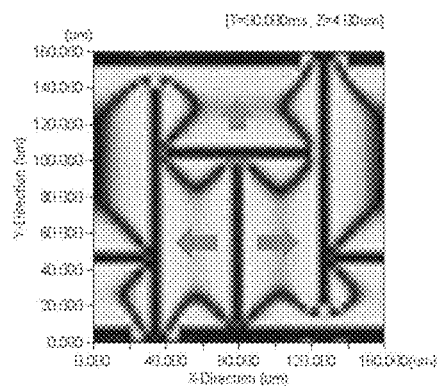
FIG. 14B is a figure showing the calculation result of the orientation texture.

FIG. 14A is a figure showing the structure of the first electrode based on simulation analysis. Note that the structures of the second electrode and second opening are the same as those shown in FIG. 11A described above. As shown in FIG. 14A, the first opening was also made into a T-shape and this first opening was disposed in the center of the rectangular region. Note that, although not shown, the first openings in the other rectangular regions adjacent to the left and right were made into inverted T-shapes. Accordingly, the first opening comprising a T-shape and the first opening comprising an inverted T-shape are alternately disposed in the horizontal direction. Each of the first openings is made smaller in size than the T-shaped and inverted T-shaped second openings provided to the second electrode, or is designed with a structure wherein the size ratios of the vertical bar sections and the horizontal bar sections differ, and thus the two never have the exact same shape. In this example, the short-side length (slit width) of the first opening was set to substantially 10 μm (micro-meters), the length of the horizontal bar section was set to substantially 85 μm (micro-meters), and the length of the vertical bar section was set to substantially 100 μm (micro-meters). FIG. 14B is a figure showing the calculation result of the orientation texture. From the figure it is understood that mainly three orientation regions comprising main orientation directions in the leftward, rightward, and upward directions are formed. While, though small, sub regions comprising orientation regions substantially orthogonal to the main orientation regions are generated via the dark regions, the surface area itself is small and does not greatly affect the viewing angle dependency.

Note that this invention is not limited to the subject matter of the foregoing embodiments, and can be implemented by being variously modified within the scope of the gist of the present invention. While each of the embodiments described above showed a structure wherein a rectangular region provided to the second electrode is cyclically disposed in each of the vertical and horizontal directions, for example, the present invention is not limited thereto. For example, the rectangular regions may be disposed in a checkerboard pattern wherein, in each row, the centers of gravity thereof are shifted substantially one-half pitch with respect to the adjacent row.

What is claimed is:

1. A liquid crystal display apparatus comprising:
    a first substrate and a second substrate disposed facing each other;
    a first electrode comprising a plurality of first openings, provided to the first substrate;
    a second electrode comprising a plurality of second openings, provided to the second substrate; and
    a liquid crystal layer disposed between the first substrate and the second substrate;
    wherein:
    a display part is defined in a region where the first electrode and the second electrode overlap;
    each of the plurality of first openings is formed into a substantially rectangular shape in planar view;
    at least a plurality of the plurality of second openings are formed into a substantially T shape, inverted T-shape, or cruciform shape in the planar view;
    the second electrode further comprises a plurality of rectangular regions cyclically disposed inside the display part in the planar view;
    the four sides that define each of the plurality of rectangular regions respectively contact any portion of the plurality of second openings; and
    each of the plurality of first openings is disposed overlapping any of the plurality of rectangular regions in the planar view.

2. The liquid crystal display apparatus according to claim 1, wherein:
    the plurality of second openings are formed into a plurality of types of shapes selected from a substantially rectangular shape, T-shape, inverted T-shape, and substantially cruciform shape.

3. The liquid crystal display apparatus according to claim 2, wherein:
    each of the plurality of first openings and the plurality of second openings is provided only to the display part.

4. The liquid crystal display apparatus according to claim 3, wherein:
    the display part is configured so as to directly define an outline of predetermined characters or designs.

5. The liquid crystal display apparatus according to claim 2, wherein:
    the display part is configured so as to directly define an outline of predetermined characters or designs.

6. The liquid crystal display apparatus according to claim 1, wherein:
    each of the plurality of first openings is disposed to one side vertically or horizontally with respect to a center of any of the plurality of rectangular regions in the planar view.

7. The liquid crystal display apparatus according to claim 6, wherein:
    each of the plurality of first openings and the plurality of second openings is provided only to the display part.

8. The liquid crystal display apparatus according to claim 7, wherein:
    the display part is configured so as to directly define an outline of predetermined characters or designs.

9. The liquid crystal display apparatus according to claim 6, wherein:
    the display part is configured so as to directly define an outline of predetermined characters or designs.

10. The liquid crystal display apparatus according to claim 1, wherein:
    each of the plurality of rectangular regions is disposed in a checkerboard pattern with respect to a vertical direction and horizontal direction in the planar view.

11. The liquid crystal display apparatus according to claim 10, wherein:
    each of the plurality of first openings and the plurality of second openings is provided only to the display part.

12. The liquid crystal display apparatus according to claim 11, wherein:
    the display part is configured so as to directly define an outline of predetermined characters or designs.

13. The liquid crystal display apparatus according to claim 10, wherein:
    the display part is configured so as to directly define an outline of predetermined characters or designs.

14. The liquid crystal display apparatus according to claim 1, wherein:
    each of the plurality of first openings and the plurality of second openings is provided only to the display part.

15. The liquid crystal display apparatus according to claim 14, wherein:
    the display part is configured so as to directly define an outline of predetermined characters or designs.

16. The liquid crystal display apparatus according to claim 1, wherein:
    the display part is configured so as to directly define an outline of predetermined characters or designs.

17. A liquid crystal display apparatus comprising:
    a first substrate and a second substrate disposed facing each other;
    a first electrode comprising a plurality of first openings, provided to the first substrate;
    a second electrode comprising a plurality of second openings, provided to the second substrate; and
    a liquid crystal layer disposed between the first substrate and the second substrate;
    wherein:
    a display part is defined in a region where the first electrode and the second electrode overlap;
    each of the plurality of first openings is formed into a substantially rectangular shape in planar view;
    the plurality of second openings are formed into a plurality of types of shapes selected from a substantially rectangular shape, T-shape, inverted T-shape, and substantially cruciform shape;
    the second electrode further comprises a plurality of rectangular regions cyclically disposed inside the display part in the planar view;
    the four sides that define each of the plurality of rectangular regions respectively contact any portion of the plurality of second openings; and
    each of the plurality of first openings is disposed overlapping any of the plurality of rectangular regions in the planar view.

18. A liquid crystal display apparatus comprising:
    a first substrate and a second substrate disposed facing each other;
    a first electrode comprising a plurality of first openings, provided to the first substrate;
    a second electrode comprising a plurality of second openings, provided to the second substrate; and
    a liquid crystal layer disposed between the first substrate and the second substrate;
    wherein:
    a display part is defined in a region where the first electrode and the second electrode overlap;
    each of the plurality of first openings is formed into a substantially rectangular shape in planar view;

each of the plurality of second openings is formed into a substantially rectangular shape, T-shape, inverted T-shape, or cruciform shape in the planar view;

the second electrode further comprises a plurality of rectangular regions cyclically disposed inside the display part in the planar view;

the four sides that define each of the plurality of rectangular regions respectively contact any portion of the plurality of second openings;

each of the plurality of first openings is disposed overlapping any of the plurality of rectangular regions in the planar view; and each of the plurality of first openings is disposed to one side vertically or horizontally with respect to a center of any of the plurality of rectangular regions in the planar view.

* * * * *